Patented Jan. 7, 1947

2,414,042

UNITED STATES PATENT OFFICE 2,414,042

MAKING ALKALI METAL SULFIDES

Charles A. Highhill, Midland, Mich., assignor to The Dow Chemical Company, Midland, Mich., a corporation of Michigan No Drawing. Application May 16, 1945,
Serial No. 594,180

4 Claims. (Cl. 23—134)

This invention relates to the manufacture of alkali metal sulfides.

It is known that sulfides can be prepared by the reduction of thiosulfates in acid or alkaline media, using a metal or the electric current as the reducing agent. However, in this reaction, sulfites are formed in a proportion equivalent to the sulfides produced, so that complete conversion of thiosulfates to sulfides is by no means achieved.

It has now been found, however, that alkali metal thiosulfates may be fully reduced to the corresponding sulfides by heating with hydrogen at an elevated temperature in the presence of an alkali metal hydroxide. The reaction may be expressed as:

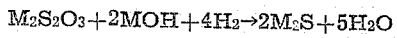

$$M_2S_2O_3 + 2MOH + 4H_2 \rightarrow 2M_2S + 5H_2O$$

wherein M is an alkali metal.

In effecting reaction, the alkali metal thiosulfate is usually dissolved in an aqueous alkaline solution and hydrogenation is carried out in a closed vessel under a pressure at least equal to the vapor pressure of the solution at the operating temperature. Catalysts are not required, the reaction proceeding smoothly at a rate dependent on the temperature and partial pressure of hydrogen.

The concentration of alkali metal thiosulfate in the initial reaction mixture may be varied over a wide range, values of the order of 1.0 mol per liter being convenient. The alkali metal hydroxide should ordinarily, though not necessarily, be present in a proportion at least equal to, and preferably in slight excess of, that stoichiometrically equivalent to the thiosulfate, i. e. at least 2.0 mols of hydroxide per mol of thiosulfate. Reaction temperatures above about 250° C., preferably 275° to 350° C., are most satisfactory. Under these conditions, reaction is usually complete within a few hours.

In practice, the aqueous alkaline thiosulfate solution is made up in the desired concentration and introduced into a closed vessel designed to withstand extreme pressures and provided with an agitator and a gas inlet. The vessel is purged of air, and hydrogen is introduced at considerable pressure. e. g. 1000 to 2000 pounds per square inch. The vessel is then sealed and heated to a reaction temperature, under which conditions pressures up to 6000 pounds or more may develop. Reaction then proceeds, as indicated by a decrease in the total pressure as hydrogen is consumed. Additional hydrogen is added as required until reaction is complete, i. e. until hydrogen is no longer used up. The vessel is then cooled and vented, and the resultant solution, in which the solute consists essentially of alkali metal sulfide and any excess alkali metal hydroxide, is withdrawn. It may be used directly in some other process, or may be worked up, as by a crystallization procedure, to recover the alkali metal sulfide in solid form.

The process of the invention is particularly useful as one step in a method for the manufacture of alkali metal sulfides and polysulfides by the reaction of sulfur with an aqueous solution of an alkali metal hydroxide. In such a process, as described in detail in U. S. Patents Nos. 1,923,392 and 1,990,202, the hydroxide solution and sulfur are heated together, preferably under pressure, for a time sufficient for the sulfur to react completely. The resulting solution contains, in addition to the desired alkali metal sulfide, a considerable proportion of alkali metal thiosulfate, which for many purposes is an undesirable by-product. The entire solution may be hydrogenated in accordance with the present invention to convert the thiosulfate in it to additional alkali metal sulfide, thus transforming the by-product into more of the desired main product.

The following example will further illustrate the invention:

Example

A solution of crystalline sodium thiosulfate pentahydrate ("hypo") and sodium hydroxide in water in concentrations of 1.0 and 2.2 mols per liter of solution, respectively, was introduced into a steel rocking autoclave and hydrogen was introduced to a pressure of 2000 pounds per square inch. The autoclave was then sealed and heated to a temperature of about 335° C., whereupon the pressure rose to about 4800 pounds per square inch and then fell off as the hydrogen began to react. Heating was continued at a temperature of about 300° C., and hydrogen was introduced at intervals over a period of several hours until it was no longer consumed. The autoclave was then cooled and the resulting solution worked up. Analysis showed that 97.7 per cent of the thiosulfate had reacted, and that the yield of sodium sulfide was 84.4 per cent of theoretical. The solution contained no sodium sulfite and very little polysulfides.

What is claimed is:

1. A process for making an alkali metal sulfide which comprises heating together an alkali metal thiosulfate, an alkali metal hydroxide, and hydrogen at a temperature sufficiently elevated to form alkali metal sulfide.

2. A process for making an alkali metal sulfide which comprises hydrogenating an aqueous alkaline solution of an alkali metal thiosulfate in a closed vessel at a temperature above about 250° C. and under a pressure at least equal to the vapor pressure of the solution at the operating temperature.

3. A process for making sodium sulfide which comprises heating an aqueous solution of sodium thiosulfate containing sodium hydroxide in at least an equivalent quantity together with at least an equivalent quantity of hydrogen in a closed vessel at a temperature between about 275° and about 350° C. and under a pressure at least equal to the vapor pressure of the solution at the operating temperature for a time sufficient to form sodium sulfide.

4. In a process for making an alkali metal sulfide wherein an aqueous solution of an alkali metal hydroxide is heated with sulfur to form a solution of alkali metal sulfide also containing alkali metal thiosulfate, the improvement comprising hydrogenating such solution in a closed vessel at a temperature above about 250° C. and under a pressure at least equal to the vapor pressure of the solution at the operating temperature for a time sufficient to convert the thiosulfate to additional alkali metal sulfide.

CHARLES A. HIGHHILL.